R. L. WILSON.
RESILIENT WHEEL FOR VEHICLES.
APPLICATION FILED NOV. 24, 1916.
1,352,858.
Patented Sept. 14, 1920.
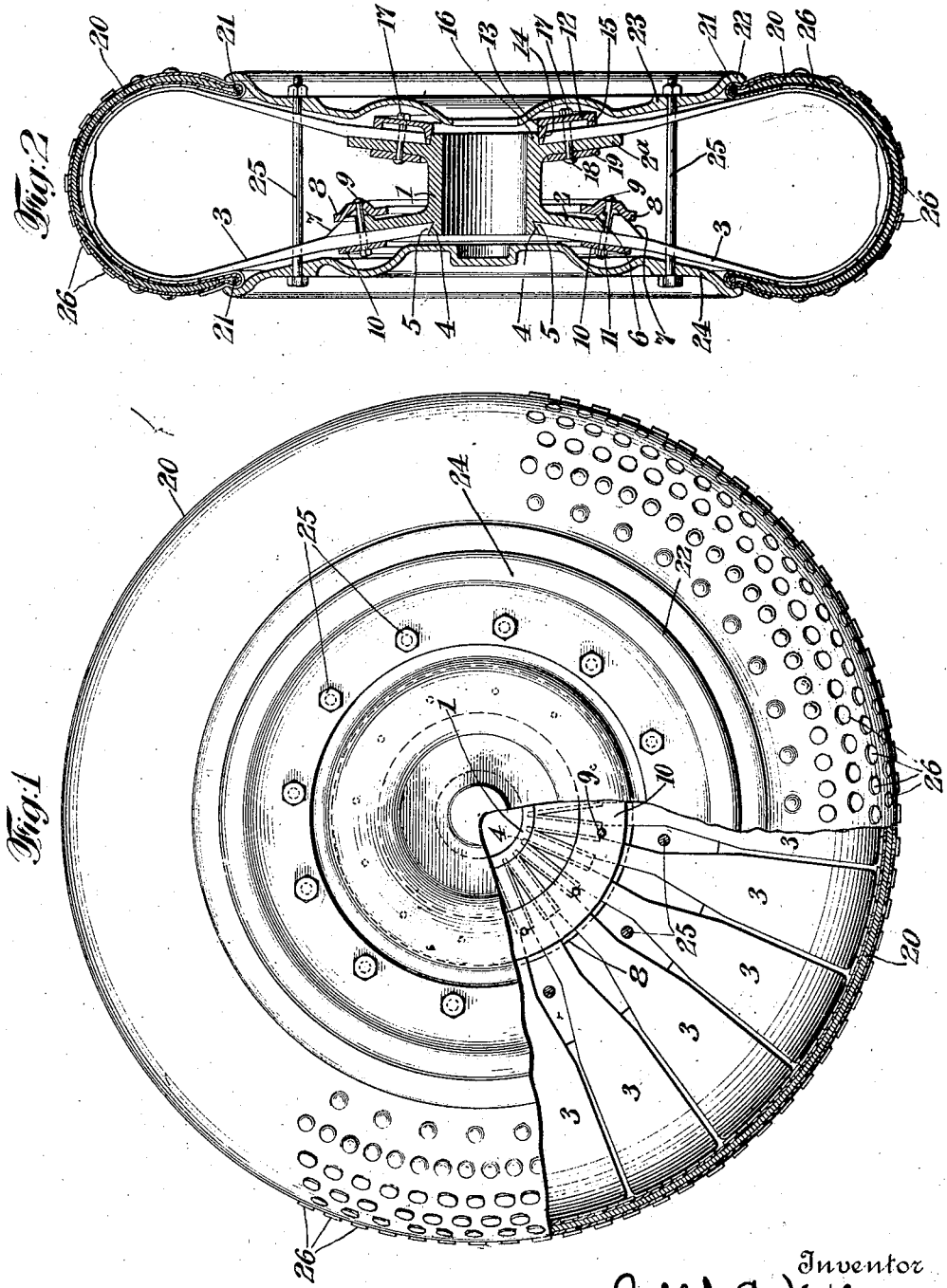
Inventor
Ralph L. Wilson
By his Attorneys
Prindle, Wright & Small

UNITED STATES PATENT OFFICE.

RALPH LINDEKVIST WILSON, OF BERGEN, NORWAY.

RESILIENT WHEEL FOR VEHICLES.

1,352,858.  Specification of Letters Patent.  Patented Sept. 14, 1920.

Application filed November 24, 1916. Serial No. 133,232.

*To all whom it may concern:*

Be it known that I, RALPH L. WILSON, of Bergen, Norway, have invented a certain new and useful Improvement in Resilient Wheels for Vehicles, and do hereby declare that the following is a full, clear, and exact description thereof.

The object of my invention has been to provide a wheel for vehicles which shall have, among other qualities, the following: that it shall be resilient and that its resiliency shall be under control; that it shall be simple and durable, and that it shall be comparatively inexpensive, and to such ends my invention consists in the resilient wheel hereinafter specified.

In the accompanying drawings—

Figure 1 is a side elevation of the wheel embodying my invention, portions being broken away to show the inner structure; and, Fig. 2 is a vertical longitudinal sectional view of Fig. 1.

My invention is capable of embodiment in many different forms, and while I have chosen the best embodiment thereof known to me with which to illustrate the invention, such embodiment is to be regarded as typical only of many possible embodiments, and my invention is not to be confined thereto.

In the illustrated embodiment, a hub 1 is provided with flanges 2 and 2ª to which are secured an annular series of U-shape springs 3. While the springs may be fastened to the hubs in any desired manner, I prefer to fasten one end thereof by forming a shoulder 4 at the base of the flange 2, which shoulder slopes toward the flange in a direction approaching the axle, and to shape the end 5 of the spring correspondingly so that the weight of the vehicle will tend to crowd the spring against the flange to counter-act any tendency to work away from it, and thus to keep it in place. I also prefer to provide a fastening which shall have the same tendency, and to that end have provided a beveled shoulder 6 on the flange 2, and a corresponding but oppositely beveled shoulder 7 on the spring, and have provided a ring 8 having a flaring channel in its outer face which is adapted to engage the said shoulders, and when the ring is forced upon the said shoulders as by a bolt 9 passing through the ring 8 and through a ring 10 on the outside of the springs, having a nut 11 on its outer end, the flaring walls of the said channel tend to draw the shoulder 7, and consequently the spring to which it is attached, toward the center of the wheel. For a purpose later to be described, I desire to be able to adjust the effective length of the U-shape spring, and for this purpose I provide means for adjusting the other end of the spring upon its flange 2ª. The illustrated means of adjustment consists of a ring 12 having a beveled shoulder 13 that bears upon the beveled end 14 of the right-hand end of the spring. The ring 12 is provided with a foot 15 on its edge opposite to the beveled shoulder 13, and this holds the body of the ring away from the side of the spring so that the ring, and consequently the beveled end 13, can be forced along a shoulder 16 on the hub, causing the beveled shoulder 13, by co-acting with the beveled end 14 of the spring, to force the latter outward radially, and thus to increase the effective length of the spring. This forcing inward of the ring 12 may be effected by the tightening of a nut 17 on a bolt 18 passing through a ring 19 on the inner side of the flange 2ª, but, of course, other means may be used. I prefer to make the inner ends of the springs dove tail in cross-section and tapered toward the center of the wheel and to have them received in correspondingly shaped sockets so that the pressure of the wheel on the ground will tend to drive such tapered ends into the sockets and thus form a fastening even without reliance on the bolts 9. As shown in Fig. 1, the U-shape springs 3 have their front and rear edges substantially radial, but are narrow enough to leave a space between each two springs so that as they are forced inward by pressure on the ground, they will have room for play.

While it is not absolutely necessary, I desire to cover the tread portion of the springs by a tire 20, and have shown the tire as provided with wires 21 in its free edges, which are adapted to be engaged by the channeled edges 22 of annular plates or rings 23 and 24, which preferably inclose the circular space inside of the tire on each side of the wheel. The rings 23 and 24 may be drawn together by means of bolts 25 passing through them. Openings are preferably provided in the rings 23 and 24 to afford access to the nuts on the bolts 9 and 18 before mentioned.

The tire may be made of any desired material, such as woven wire or canvas and rubber, but my invention is not to be confined to any particular structure. In order to prevent wear of the tire, I preferably provide studs 26 sufficiently closely over its surface, so that, with a given stiffness of tire, and pressure at any given point, the weight will be distributed over several of said studs. The heads of the studs, on their inner ends, preferably have sufficient thickness so that by resting against the springs they will prevent any portion of the tire from coming into contact with, and wearing against the springs.

It will be observed that I have provided a resilient wheel in which no use is made of pneumatic pressure. The resiliency is obtained by a very simple system of springs which are of comparatively simple structure. The resiliency of the springs can be controlled by drawing the rings 23 and 24 more or less together, thus bringing pressure upon the U-shape springs, which will stiffen them more or less and yet the pressure is so far above the bent or tread portion of the springs that the springs will still have a sufficiently resilient action.

The tightness of the tire can be regulated and insured by means of the adjustment before described, in which the beveled shoulder 13 upon the ring 12, acting upon the beveled end of the spring, will force the springs radially upward, thus causing their tread portions to occupy a larger circle and stretch the tire to any desired stop.

My resilient tire has the very great advantage that the springs do not rub upon each other or upon any other part of the wheel structure. This advantage makes both for durability and resiliency.

I claim:

1. A resilient wheel comprising a hub having U-shape springs, the ends of which are fastened to said hub, and means for adjusting said springs radially outward, said means comprising a ring having a beveled shoulder co-acting with beveled shoulders on said springs.

2. A resilient wheel comprising a hub having U-shape springs, the ends of which are fastened to said hub, means for adjusting said springs radially outward, said means comprising a ring having a beveled shoulder co-acting with beveled shoulders on said spring, and means for forcing said shoulders more or less together.

3. A resilient wheel comprising a hub and having U-shape springs, the ends of which are fastened to said hub, means for adjusting said springs radially outward, said means comprising a ring having a beveled shoulder co-acting with beveled shoulders on said springs, and means for forcing said shoulders more or less together, said means comprising screws engaging said hub and said ring.

4. A resilient wheel comprising a hub and U-shape springs having their loops forming the tread portion of the wheel, said hub having a flange and a shoulder beveled on said flange in a direction approaching the axle, said springs having correspondingly beveled shoulders, and means for drawing said springs against said flange and forcing their beveled ends against said shoulder.

5. A resilient wheel comprising a hub and U-shape springs having their loops forming the tread portion of the wheel, said hub having a flange and a shoulder beveled on said flange in a direction approaching the axle, said springs having correspondingly beveled shoulders, and means for drawing said springs against said flange and forcing their beveled ends against said shoulder, said means comprising oppositely beveled shoulders on said flange and springs, and a ring having a beveled channel adapted to engage said oppositely beveled shoulders.

6. A resilient wheel comprising a hub and U-shape springs having their loops forming the tread portion of the wheel, said hub having a flange and a shoulder beveled on said flange in a direction approaching the axle, said springs having correspondingly beveled shoulders, and means for drawing said springs against said flange and forcing their beveled ends against said shoulder, said means comprising oppositely beveled shoulders on said flange and springs, and a ring having a beveled channel adapted to engage said oppositely beveled shoulders, and means for forcing said channel and shoulders together.

7. A resilient wheel comprising a hub and U-shape springs having their loops forming the tread portion of the wheel, said hub having a flange and a shoulder beveled on said flange in a direction approaching the axle, said springs having correspondingly beveled shoulders, and means for drawing said springs against said flange and forcing their beveled ends against said shoulder, said means comprising oppositely beveled shoulders on said flange and springs, and a ring having a beveled channel adapted to engage said oppositely beveled shoulders, and means for forcing said channel and shoulders together, said means comprising a screw.

8. A resilient wheel comprising a hub having flanges, U-shape springs attached to said flanges, and having their loops forming a resilient tread for said wheel, and annular plates or rings adapted to engage the sides of said springs within said tread and to control their resiliency.

9. A resilient wheel comprising a hub having flanges, U-shape springs attached to said flanges, and having their loops forming a resilient tread for said wheel, and annular plates or rings adapted to engage the sides of said springs within said tread and to control their resiliency, and means for drawing said annular plates or rings together.

10. A resilient wheel comprising a hub, U-shape springs attached to said hub and having their loops forming a resilient tread, a fabric tire inclosing said tread, and studs carried by said tire and resting upon said springs to prevent wear of the tire by said springs.

11. A resilient wheel comprising a hub having flanges, U-shape springs secured to said flanges and having their loops forming a resilient tread, a fabric tire inclosing said tread and having beaded edges, and annular plates or rings on opposite sides of said wheel and having means to engage said beaded edges.

12. A resilient wheel comprising a hub having flanges, U-shape springs secured to said flanges and having their loops forming a resilient tread, a fabric tire inclosing said tread and having beaded edges, annular plates or rings on opposite sides of said wheel and having means to engage said beaded edges, and means for drawing said annular plates or rings together to regulate the resiliency of said springs.

13. A resilient wheel comprising the combination of a hub and a tread formed of U-shape spring bands, having their loops forming the tread portion of the wheel, and means for varying the distance from the center of the wheel of the portions of the bands forming the tread, said means comprising rings engaging opposite sides of said bands, and clamping devices for drawing said rings together.

In testimony that I claim the foregoing I have hereunto set my hand.

RALPH LINDEKVIST WILSON.

Witnesses:
    EDWIN J. PRINDLE,
    MARGARET S. MACINTYRE.